(12) United States Patent
Ha et al.

(10) Patent No.: US 12,401,080 B2
(45) Date of Patent: Aug. 26, 2025

(54) METHOD OF SETTING CELL PRESSURE RANGE FOR SECONDARY BATTERY MODULE

(71) Applicant: LG ENERGY SOLUTION, LTD., Seoul (KR)

(72) Inventors: Jong-Soo Ha, Daejeon (KR); Se-Ho Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 557 days.

(21) Appl. No.: 17/792,568

(22) PCT Filed: Sep. 17, 2021

(86) PCT No.: PCT/KR2021/012854
§ 371 (c)(1),
(2) Date: Jul. 13, 2022

(87) PCT Pub. No.: WO2022/097912
PCT Pub. Date: May 12, 2022

(65) Prior Publication Data
US 2023/0078958 A1   Mar. 16, 2023

(30) Foreign Application Priority Data
Nov. 5, 2020 (KR) .......... 10-2020-0146829

(51) Int. Cl.
*H01M 50/242* (2021.01)
*H01M 50/211* (2021.01)
(Continued)

(52) U.S. Cl.
CPC ....... *H01M 50/242* (2021.01); *H01M 50/211* (2021.01); *H01M 50/264* (2021.01); *H01M 10/0525* (2013.01)

(58) Field of Classification Search
None
See application file for complete search history.

(56) References Cited

U.S. PATENT DOCUMENTS

| | | | |
|---|---|---|---|
| 2002/0006545 A1 | 1/2002 | Marukawa et al. | |
| 2004/0021442 A1 | 2/2004 | Higashino | |

(Continued)

FOREIGN PATENT DOCUMENTS

| | | |
|---|---|---|
| CN | 111426959 A | 7/2020 |
| JP | 2001-167745 A | 6/2001 |

(Continued)

OTHER PUBLICATIONS

International Search Report (PCT/ISA/210) issued in PCT/KR2021/012854, dated Jan. 3, 2022.

(Continued)

*Primary Examiner* — Wyatt P McConnell
(74) *Attorney, Agent, or Firm* — Birch, Stewart, Kolasch & Birch, LLP

(57) ABSTRACT

A method of setting a cell pressure range includes based on performance data of a secondary battery cell, determining, as Pcell_min, a minimum pressure for realizing performance of the secondary battery cell, and determining, as Pcell_max, a maximum pressure for realizing performance of the secondary battery cell; and a second operation of determining, as Pmodule_min, a minimum pressure at which a cell stack may be supported and fixed, and determining, as Pmodule_max, a maximum pressure at which the cell stack may be pressed without damage to a module housing in end of life (EOL) of secondary battery cells, wherein an intersection range of the Pcell_min to the Pcell_max and the Pmodule_min to the Pmodule_max is set as the cell pressure range.

11 Claims, 8 Drawing Sheets

(51) Int. Cl.
*H01M 50/264* (2021.01)
*H01M 10/0525* (2010.01)

(56) References Cited

U.S. PATENT DOCUMENTS

| | | | |
|---|---|---|---|
| 2005/0186470 A1* | 8/2005 | Marukawa | H01M 50/258 |
| | | | 429/149 |
| 2017/0074634 A1 | 3/2017 | Yoon et al. | |
| 2020/0106058 A1 | 4/2020 | Kim | |
| 2020/0158596 A1 | 5/2020 | Kim et al. | |
| 2021/0025771 A1 | 1/2021 | Park et al. | |
| 2021/0226246 A1* | 7/2021 | Yun | H01M 50/547 |
| 2022/0255181 A1* | 8/2022 | Takahashi | H01M 10/44 |

FOREIGN PATENT DOCUMENTS

| | | |
|---|---|---|
| JP | 2004-63352 A | 2/2004 |
| JP | 2005-339925 A | 12/2005 |
| JP | 2008-288168 A | 11/2008 |
| JP | 4700783 B2 | 6/2011 |
| JP | 2013-200977 A | 10/2013 |
| JP | 2015-37047 A | 2/2015 |
| JP | 2016-39022 A | 3/2016 |
| JP | 2016-39023 A | 3/2016 |
| JP | 2017-133994 A | 8/2017 |
| JP | 2017-147021 A | 8/2017 |
| JP | 2017-224498 A | 12/2017 |
| JP | 2018-92833 A | 6/2018 |
| KR | 10-2016-0063278 A | 6/2016 |
| KR | 10-2018-0087041 A | 8/2018 |
| KR | 10-2019-0063809 A | 6/2019 |
| KR | 10-2020-0046633 A | 5/2020 |
| WO | WO 03/085754 A1 | 10/2003 |

OTHER PUBLICATIONS

Extended European Search Report for European Application No. 21889377.4, dated Dec. 6, 2023.

* cited by examiner

METHOD OF SETTING CELL PRESSURE RANGE FOR SECONDARY BATTERY MODULE

TECHNICAL FIELD

The present disclosure relates to a method of manufacturing a secondary battery module, and more particularly, to a method of setting an optimal pressure range of secondary battery cells for performance optimization and structural stability of a secondary battery module.

The present application claims priority to Korean Patent Application No. 10-2020-0146829 filed on Nov. 5, 2020 in the Republic of Korea, the disclosures of which are incorporated herein by reference.

BACKGROUND ART

Types of secondary batteries currently widely used include lithium ion batteries, lithium polymer batteries, nickel cadmium batteries, nickel hydrogen batteries, and nickel zinc batteries. An operating voltage of these unit secondary batteries cells is about 2.5 V-4.2 V. Therefore, when a higher output voltage is required, a plurality of secondary battery cells are connected in series or a plurality of secondary battery cells are connected in series and in parallel according to charge/discharge capacity, to form a battery module.

When a plurality of secondary battery cells are connected in series/in parallel to form a medium/large battery module, a lithium-polymer pouch-type secondary battery cell with high energy density and easy stacking is used a lot to form a cell stack. Next, a method of forming a battery module by storing and protecting the cell stack in a module housing and adding electrical components for electrical connection and voltage measurement of secondary battery cells is common.

However, in a process of repeated charging and discharging of a lithium-polymer pouch-type secondary battery, an electrode may thicken, or an internal electrolyte may be decomposed as a side reaction to generate gas. In this case, a phenomenon in which the pouch-type secondary battery cell swells due to electrode expansion and/or generated gas is referred to as a "swelling phenomenon". For reference, the swelling phenomenon is largely due to factors caused by electrode expansion during charging and discharging.

When the swelling phenomenon in the pouch-type secondary battery cell worsens, the performance of the secondary battery cell may deteriorate, and the external shape of the module housing may be changed, thereby adversely affecting the structural stability of the battery module.

According to research so far, it is known that when stacked secondary battery cells are strongly pressed from the beginning of assembly, thickness expansion due to swelling is relatively small. Accordingly, among technologies for preventing the swelling phenomenon, a technology for dispersing expansion force by inserting a pressure pad between secondary battery cells, and a technology for tightening and pressing a module housing by using a strap are known.

However, when secondary battery cells are pressed, an amount of pressure to be applied is set empirically, and there is no method of setting a pressure based on qualitative/quantitative data. Accordingly, a method of systematizing a cell pressure setting range is required for performance optimization and structural stability of a secondary battery module.

DISCLOSURE

Technical Problem

The present disclosure is designed to solve the problems of the related art, and therefore the present disclosure is directed to providing a method of setting an optimal pressure range for secondary battery cells in manufacturing a secondary battery module.

Other objects and advantages of the present disclosure may be understood from the following description and will become more fully apparent from embodiments of the present disclosure. Also, it will be easily understood that the objects and advantages of the present disclosure may be realized by the means shown in the appended claims and combinations thereof.

Technical Solution

A method of setting a cell pressure range according to an embodiment of the present disclosure includes: a first operation of determining a secondary battery cell to be applied to the secondary battery module, and based on performance data of the secondary battery cell obtained when the secondary battery cell is pressed with increasing pressure, determining a minimum pressure for realizing performance of the secondary battery cell as Pcell_min and determining a maximum pressure for realizing performance of the secondary battery cell as Pcell_max; and a second operation of, when the secondary battery cells are stacked in one direction to form a cell stack and the cell stack is stored in a module housing, determining, as Pmodule_min, a minimum pressure at which the cell stack is supported and fixed and determining, as Pmodule_max, a maximum pressure at which the cell stack is pressed without damage to the module housing in end of life (EOL) of the secondary battery cells, wherein an intersection range of the Pcell_min to the Pcell_max and the Pmodule_min to the Pmodule_max may be set as the cell pressure range, and applying pressure within the cell pressure range to the cell stack while stacked in the module housing.

In the first operation, the performance data of the secondary battery cell may include a capacity degradation rate, a resistance increase rate, and a separation membrane thickness retention rate of the secondary battery cell.

The Pmodule_min may be a minimum pressure at which the cell stack may be supported and fixed in begin of life (BOL) of the secondary battery cells.

The secondary battery cell may be a pouch-type secondary battery cell.

A third operation of pre-setting an allowable expansion dimension of the module housing according to swelling of the secondary battery cells, determining, as Pdimension_min, a minimum pressure at which a dimension of the module housing is manageable within the allowable expansion dimension by pressing the cell stack in BOL of the secondary battery cells, and determining, as Pdimension_max, a minimum pressure at which a dimension of the module housing is manageable within the allowable expansion dimension by pressing the cell stack in the EOL of the secondary battery cells is further included, wherein a largest value among the Pcell_min, the Pmodule_min, and the Pdimension_min may be set as the minimum pressure of the cell pressure range, and when (the Pdimension_max<the Pcell_max) and (the Pdimension_max<the Pmodule_max)

are satisfied, a smaller value of the Pcell_min and the Pmodule_min may be set as the maximum pressure of the cell pressure range.

The module housing may include: a bottom plate arranged under the cell stack; and a left-side plate and a right-side plate that are bent at opposite edges of the bottom plate, extend upward, and have a predetermined inward angular inclination, and the cell stack may be placed between the left-side plate and the right-side plate to be pressed therebetween.

The module housing may adjust the pressure applied to the cell stack by forming different sizes of inclinations of the left-side plate and the right-side plate.

The module housing may include a leaf spring therein, and the cell stack may be pressed by the leaf spring.

In another aspect of the present disclosure, there may be provided a secondary battery module manufactured using the method of setting the cell pressure range.

In another aspect of the present disclosure, there may be provided a secondary battery pack including one or more secondary battery modules.

The method may further include applying pressure to the cell stack with a leaf spring attached to an inner surface of the module housing.

The method may further include biasing opposite sides of the module housing toward one another to apply pressure to the cell stack.

Applying pressure within the cell pressure range to the cell stack in the module housing may include applying pressure with sidewalls of the module housing.

Advantageous Effects

According to one aspect of the present disclosure, there may be provided a method of setting a cell pressure range, which enables pressurization of secondary battery cells within an optimal pressure range based on quantitative data.

Other objects and advantages of the present disclosure may be understood from the following description and will become more fully apparent from embodiments of the present disclosure. Also, it will be easily understood that the objects and advantages of the present disclosure may be realized by the means shown in the appended claims and combinations thereof.

MODE OF DISCLOSURE

Figure 1:
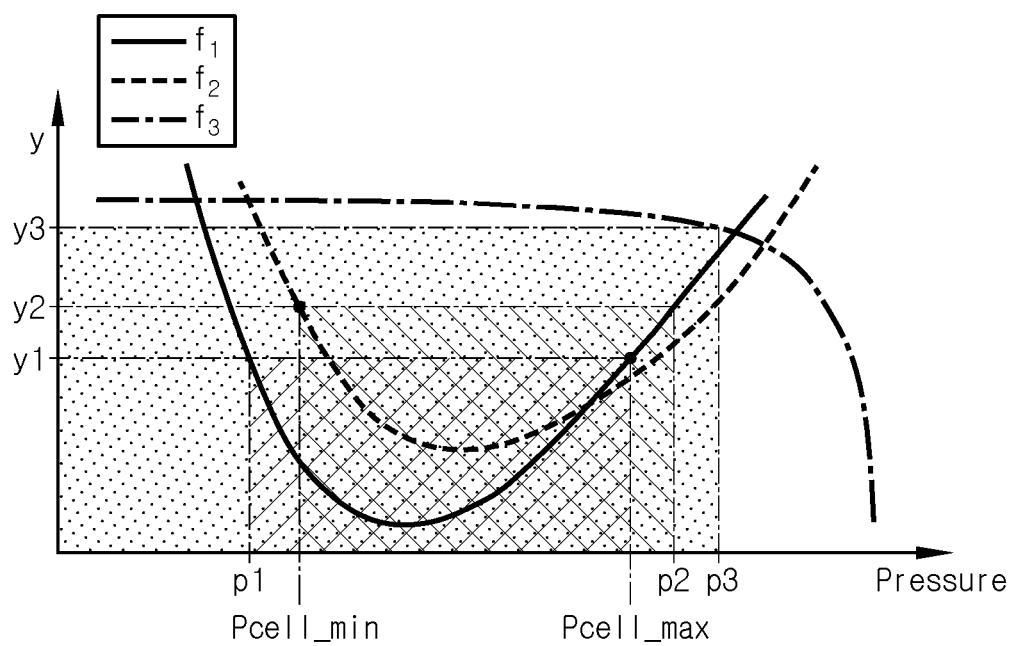
FIG. 1 is a graph schematically showing a relationship between pressure and performance of a unit secondary battery cell.

Since embodiments of the present disclosure are provided to more fully explain the present disclosure to those skilled in the art, the shapes and dimensions of components in the drawings may be exaggerated, omitted, or schematically illustrated for a clearer description. Accordingly, the dimensions or proportions of each component do not fully reflect the actual dimensions proportions.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

A method of setting a cell pressure range described in the present specification refers to a method of setting an optimal pressure range for secondary battery cells when pressing and storing the secondary battery cells in a module housing in a process of manufacturing a secondary battery module.

A method of setting a cell pressure range according to an embodiment of the present disclosure includes a first operation of deriving a pressure range from characteristics of a unit secondary battery cell 110 and a second operation of deriving a pressure range from characteristics of secondary battery cells 110 and a module housing 300 in an operation of designing a secondary battery module.

In the present embodiment, the secondary battery cell 110 refers to a pouch-type secondary battery. The pouch-type secondary battery is a secondary battery in which an electrode assembly and an electrolyte are sealed with a pouch sheet.

The electrode assembly may be, as an assembly of an electrode and a separation membrane, configured in a form in which one or more positive electrode plates and one or more negative plates are arranged with the separation membrane interposed therebetween. Each electrode plate of the electrode assembly includes an electrode tab, the electrode tab is connected to an electrode lead, and one end of the electrode lead is exposed to the outside of a pouch exterior, thereby functioning as an electrode terminal. The pouch case includes an outer insulating layer, a metal layer, and an inner adhesive layer and stores the electrode assembly and the electrolyte, and an edge thereof is thermally fused. The configuration of the pouch-type secondary battery cell 110 is obvious to those skilled in the art to which the present disclosure pertains, and thus, more detailed descriptions thereof will be omitted.

Although the present embodiment aims at the pouch-type secondary battery cell 110, when a secondary battery module is formed, a flat prismatic secondary battery cell 110 in a rectangular parallelepiped shape may be used as an alternative to the pouch-type secondary battery cell 110.

The first operation of the method of setting the cell pressure range according to the present disclosure includes, as an operation for finding a pressure range for realizing optimal performance of the secondary battery cell 110, applying pressure to the unit secondary battery cell 110 to be applied to the secondary battery module and then setting a pressure range based on data indicating the optimal performance of the secondary battery cell 110.

FIG. 1 is a graph schematically showing a relationship between pressure and performance of the unit secondary battery cell 110.

When the unit secondary battery cell 110 is pressed with increasing pressure, and charging and discharging are performed, the unit secondary battery cell 110 typically exhibits a capacity degradation rate, an internal resistance increase rate, and a separation membrane thickness retention rate, as shown in FIG. 1.

In the graph of FIG. 1, $f_1$ refers to a capacity degradation rate, $f_2$ refers to a resistance increase rate, and $f_3$ refers to a separation membrane thickness retention rate.

For example, in the graph of FIG. 1, when a pressure greater than P3 is applied to the secondary battery cell 110, cracks may occur in the separation membrane. Therefore, in the first operation, a maximum pressure in the cell pressure range is determined to be a value smaller than P3.

When the capacity degradation rate of a certain secondary battery cell 110 is greater than a specific value y1 or the resistance increase rate thereof is greater than a specific value y2, performance of the secondary battery cell may be significantly reduced. (y1 and y2 of FIG. 1 may be different values for each secondary battery cell 110.) Therefore, a pressure range in which the capacity degradation rate is less than or equal to y1 and the resistance increase rate is less than or equal to y2 is found. Then, in FIGS. 1, P1 to P2 is the pressure range, wherein P1 is determined as a minimum pressure Pcell_min for realizing performance of the secondary battery cell 110, and P2 is determined as a maximum pressure Pcell_max for realizing performance of the secondary battery cell 110.

Figure 2:
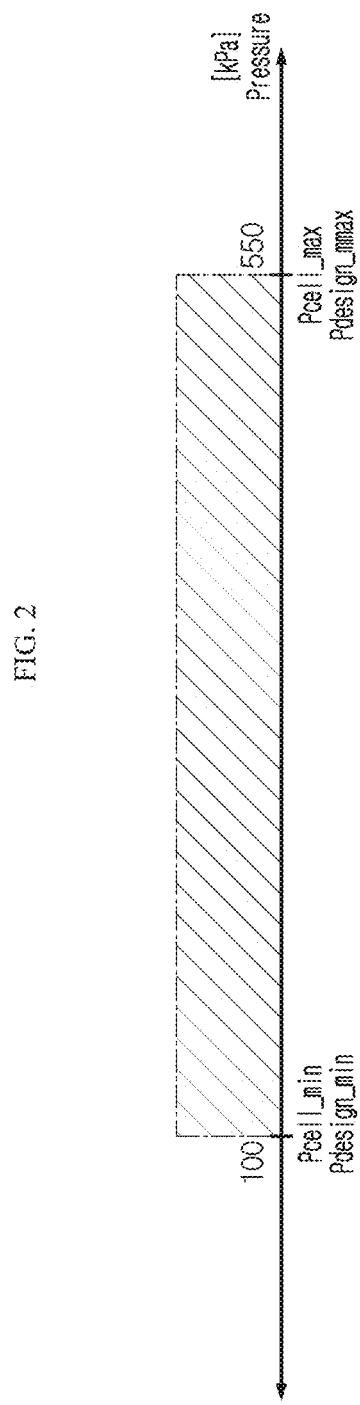
FIG. 2 is a diagram illustrating a cell pressure range according to a result of performing a first operation of a method of setting a cell pressure range, according to an embodiment of the present disclosure.

As in FIG. 2, Pcell_min and Pcell_max derived in the first operation are respectively set as a minimum value (hereinafter, referred to as Pdesign_min) in the cell pressure range and a maximum value (hereinafter, referred to as a Pdesign_max) in the cell pressure range.

In the present embodiment, Pcell_min is exemplified as 100 kPa and Pcell_max is exemplified as 550 kPa, which are arbitrarily specified values of Pcell_min and Pcell_max for convenience of description, and may vary depending on which secondary battery cell is used.

For reference, even in the case of the pouch-type secondary battery cell 110, a manufacturing method, internal configuration, and initial capacity thereof may be differently manufactured. Likewise, secondary battery cells 110 having different manufacturing methods, internal configurations, initial capacities, and the like may have different capacity degradation rates or resistance increase rates even when the same pressure is provided.

Therefore, when the secondary battery cells 110 are sorted by types and tested and the minimum pressure Pcell_min and the maximum pressure Pcell_max according to the results are arranged in a lookup table, a secondary battery cell 110 of specific specifications to be applied to the secondary battery module may be determined later, and immediately, a pressure range under conditions in which the secondary battery cell 110 may exhibit optimal performance may be found from the lookup table and determined as Pcell_min and Pcell_max.

The second operation of the method of setting the cell pressure range according to the present disclosure may refer to an operation for finding a pressure range for realizing structural stability in designing the secondary battery module. That is, the second operation includes finding a minimum pressure (hereinafter, referred to as Pmodule_min) and a maximum pressure (hereinafter, referred to as Pmodule_max) for realizing structural stability of the secondary battery module.

The Pmodule_min may be set to a minimum pressure at which a cell stack 100 may be supported and fixed when the cell stack 100 is formed by stacking the secondary battery cells 110 in one direction and the cell stack 100 is stored in the module housing 300. Also, the Pmodule_max may be set to a maximum pressure at which the cell stack 100 may be pressed in a pressure range in which the module housing 300 is not damaged in end of life (EOL) of the secondary battery cells 110.

For example, the electrode lead of the secondary battery cells 110 are welded to a bus bar to electrically connect the secondary battery cells 110, and when the secondary battery cells 110 move due to external impact or vibration, electrical reliability may be reduced. Therefore, in the case of a battery module having a structure pressing the cell stack 100, in order to maintain performance and ensure electrical stability of the secondary battery cells 110, at least, the cell stack 100 needs to be supported and fixed in a state of being pressed by both side walls of the module housing 300.

In the second operation, a minimum pressure at which the cell stack 100 may be supported and fixed in the module housing 300 is set to Pmodule_min by reflecting the above.

Here, the Pmodule_min may be a pressure value at which the cell stack 100 may be supported and fixed in begin of life (BOL) of the secondary battery cells 110. This is because it is assumed that secondary battery cells 110 in an unused state are stacked to form the cell stack 100 and pressed and stored in the module housing 300. Here, the BOL may mean a time when the secondary battery cell 110 is manufactured and then a charging and discharging cycle for activation is performed a predetermined number of times and there is no capacity degradation.

The Pmodule_max is determined by reflecting two factors.

First, when the cell stack 100 is pressed by the module housing 300, according to the law of action and reaction, pressure applied by the module housing 300 to the cell stack 100 and pressure applied by the cell stack 100 to the module housing 300 are the same. Therefore, when the cell stack 100 is pressed over a certain pressure, cracks may occur in the module housing 300, thereby breaking structural stability of the secondary battery module. Therefore, preferably, Pmodule_max is set within a pressure that the module housing 300 may withstand, that is, within a maximum threshold pressure that may press the cell stack 100 without damage to the module housing 300.

Second, in a process of repeated charging and discharging of the secondary battery cell 110, the electrode may thicken, or an internal electrolyte may be decomposed as a side reaction to generate a small amount of gas. That is, in the secondary battery cell 110, a swelling phenomenon may occur due to electrode expansion and/or swelling caused by a small amount of generated gas. At this time, swelling pressure may affect structural rigidity of the module housing 300. Therefore, when Pmodule_max is determined, swelling pressure of the secondary battery cells 110 is reflected.

The swelling phenomenon of the secondary battery cells 110 appears most clearly in the EOL defined as the lifespan of the secondary battery cells 110. (Here, EOL is generally defined as up to 80% of BOL.) In general, normally used and managed secondary battery cells 110 may have a degree of swelling in EOL predicted in advance. Therefore, a maximum threshold pressure that may press the cell stack 100 without damage to the module housing 300 in the EOL of the secondary battery cells 110 with the most pronounced swelling is set to Pmodule_max.

Next, by comparing Pcell_min, Pcell_max, Pmodule_min, and Pmodule_max, which are obtained by performing the first operation and the second operation, Pdesign_min and Pdesign_max are determined as follows.

$$P\text{design\_min} = \text{Max.}(P\text{cell\_min}, P\text{module\_min})$$

$$P\text{design\_max} = \text{Min.}(P\text{cell\_max}, P\text{module\_max})$$

Therefore, a cell pressure range, from Pdesign_min to Pdesign_max, according to the present disclosure may be referred to as an intersection range of Pcell_min to Pcell_max and Pmodule_min to Pmodule_max.

Figure 3:
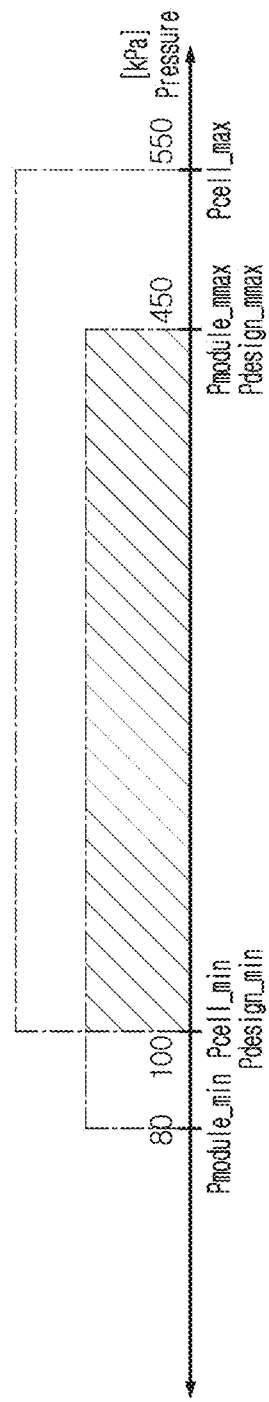
FIG. 3 is a diagram illustrating a cell pressure range according to a result of performing a first operation and a second operation of a method of setting a cell pressure range, according to an embodiment of the present disclosure.

For example, as in FIG. 3, when Pcell_min is 100 kPa, Pcell_max is 550 kPa, Pmodule_min is 80 kPa, and Pmodule_max is 450 kPa, Pdesign_min=Max.(100 kPa, 80 kPa) and Pdesign_max=Min.(550 kPa, 450 kPa). Therefore, the secondary battery module of the present embodiment needs to be assembled in such a manner that the cell stack 100 receives a pressure within a range of 100 kPa to 450 kPa when assembling, so that both the performance and structural stability of the secondary battery module may be satisfied.

Figure 4:
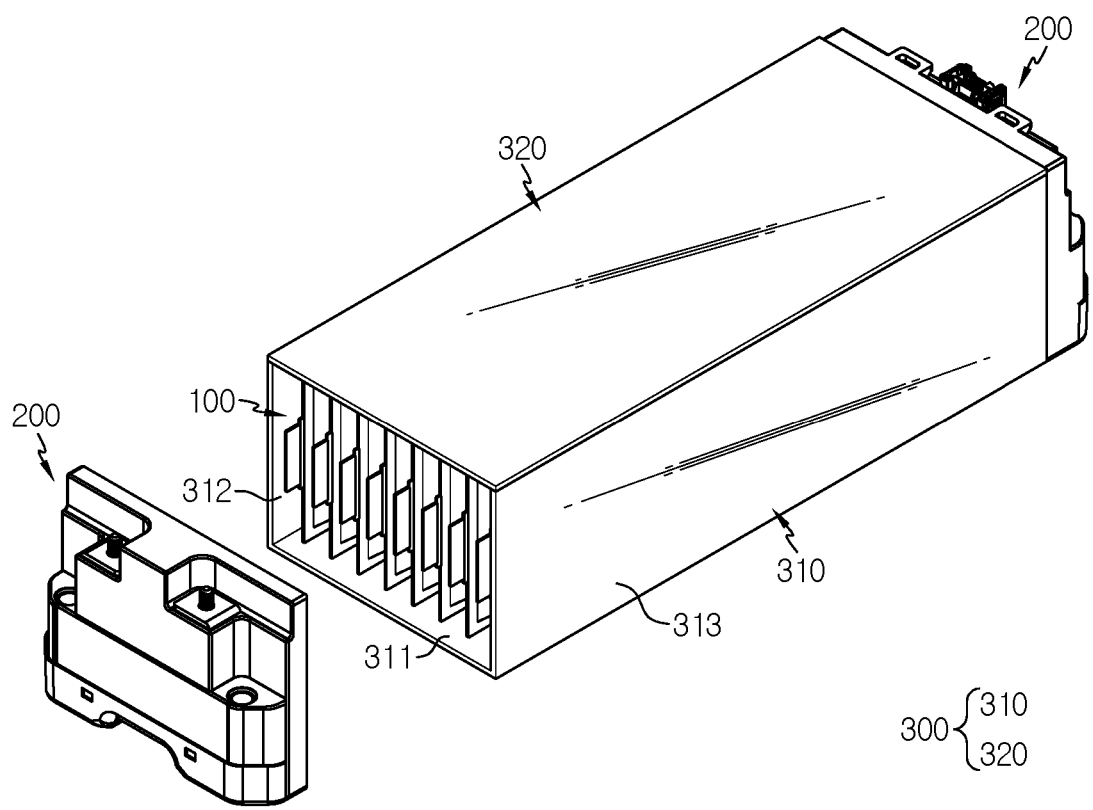
FIG. 4 is a diagram schematically showing a configuration of a secondary battery module according to an embodiment of the present disclosure.
Figure 5:
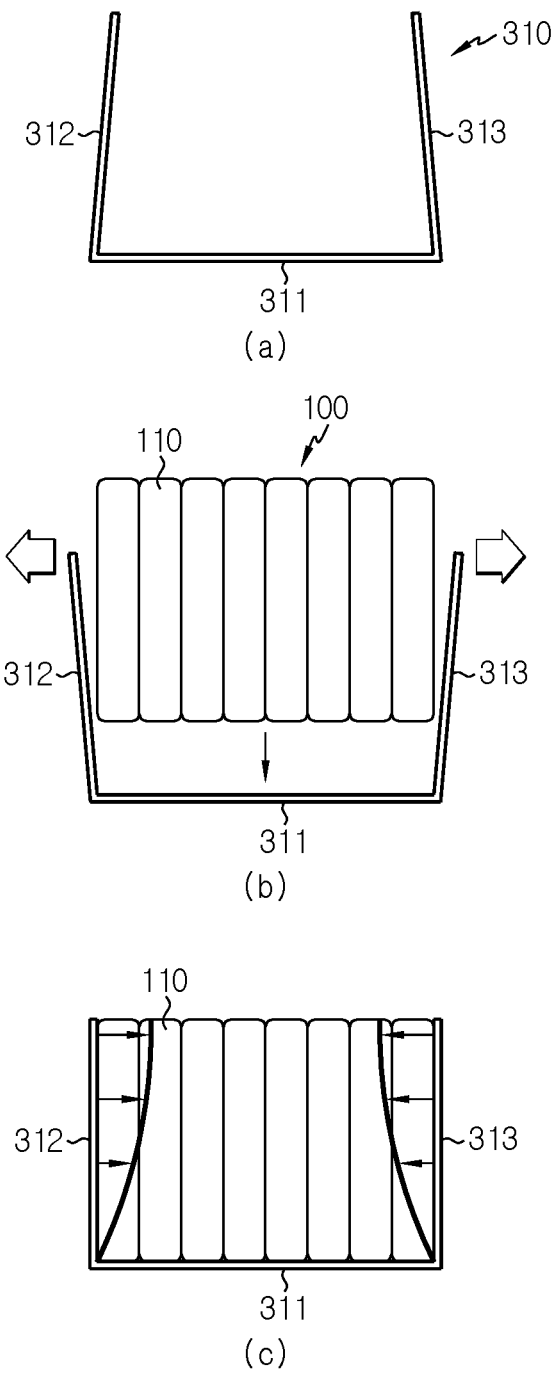
FIG. 5 is a diagram showing a method of pressing a cell stack by using a module housing of FIG. 4.

FIG. 4 is a diagram schematically showing a configuration of a secondary battery module according to an embodiment of the present disclosure, and FIG. 5 is a diagram showing a method of pressing the cell stack 100 by using the module housing 300.

Next, a method of pressing the cell stack 100 and a pressing structure, according to an embodiment of the present disclosure, are briefly described with reference to FIGS. 4 and 5.

The secondary battery module may include the cell stack 100, inter connection board (ICB) cover assembly 200, and the module housing 300.

The cell stack 100 is an assembly of pouch-type secondary battery cells 110 stacked with wide surfaces facing each other as described above.

The ICB cover assembly 200 includes a plurality of bus bars (not shown) for electrical connection between the secondary battery cells 110, terminals of a module, and a cover for preventing external exposure thereof, and as in FIG. 4, may be mounted on the module housing 300 and arranged at the front and rear sides of the cell stack 100.

The module housing 300 is a rigid structure that has an inner space for storing the cell stack 100, provides mechanical support to the cell stack 100, and serves to protect from external impact. The module housing 300 is preferably made of a metal material to ensure rigidity, but may be made of a non-metal material as long as a material has a rigidity corresponding to a metal.

For example, the module housing 300 may be provided in a square tube shape including a U-frame 310 including a bottom plate 311 forming a bottom surface, a left-side plate 312 forming a left wall surface, and a right-side plate 313 forming a right wall surface, and a top plate 320 coupled to the top end of the U-frame 310.

When the cell stack 100 is stored in the U-frame 310, the cell stack 100 is pressed by the left-side plate 312 and the right-side plate 313, and the cell stack 100 may be pressed in the module housing 300 by seating and welding the top plate 320 onto the top end of the left-side plate 312 and the top end of the right-side plate 313.

In detail, referring to (a) of FIG. 5, the left-side plate 312 and the right-side plate 313 may be configured to extend upward from opposite edges of the bottom plate 311 and have a predetermined angular inclination toward the inside of the module housing 300.

When the cell stack 100 is stored in the U-frame 310, as in (b) of FIG. 5, the left-side plate 312 and the right-side plate 313 are pulled outward to secure a space, and the cell stack 100 is placed therein and seated on the bottom plate 311. Next, as in (c) of FIG. 5, the cell stack 100 is pressed by placing the left-side plate 312 and the right-side plate 313. Next, the top plate 320 is seated and welded onto the top end of the U-frame 310. In this case, the strength of pressure to be applied to the cell stack 100 may be adjusted by adjusting the thicknesses and inclinations of the left-side plate 312 and the right-side plate 313 to be large or small.

Figure 6:
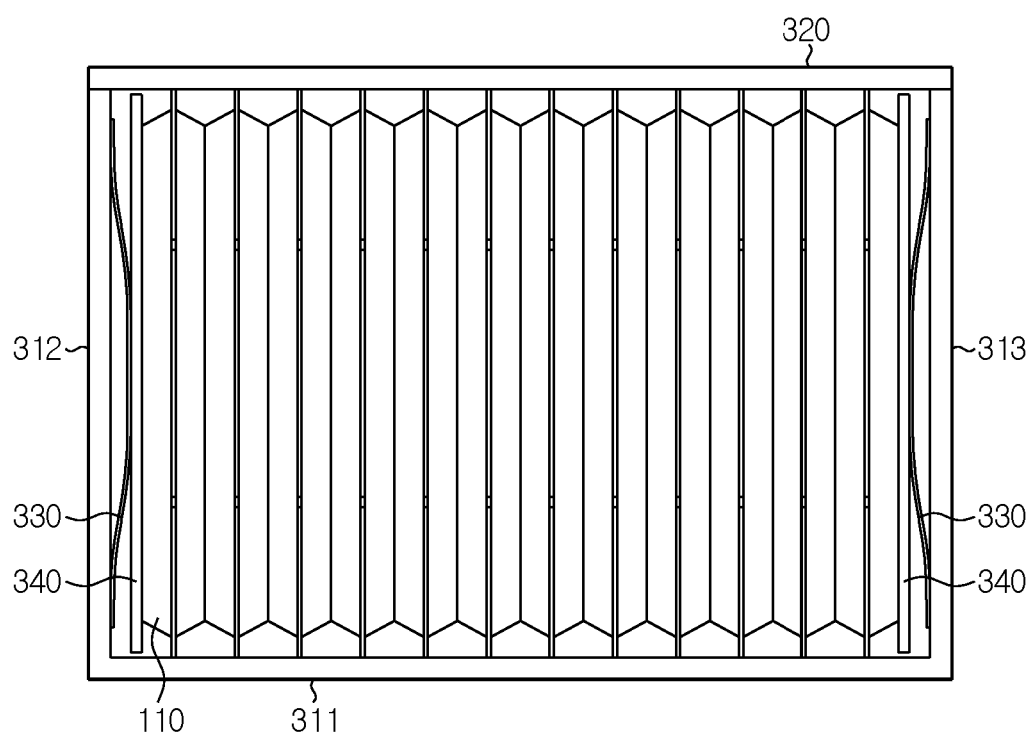
FIG. 6 is a diagram showing a modified example of a method of pressing a cell stack according to FIG. 5.

FIG. 6 is a diagram showing a modified example of a method of pressing the cell stack 100 according to FIG. 5.

As another method of pressing the cell stack 100, a leaf spring 330 may be used. For example, as shown in FIG. 6, the module housing 300 may further include a pressure plate 340 facing an outermost secondary battery cell 110 in the cell stack 100 and the leaf spring 330. The leaf spring 330 may be arranged in a compressed state between the pressure plate 340 and a side plate. In this case, the elastic restoring force of the leaf spring 330 may act as a pressure for pressing the cell stack 100.

In addition, there may be several more methods of storing the cell stack 100 in the module housing 300 in a pressed state. For example, before putting the cell stack 100 into the module housing 300, the cell stack 100 may be pre-pressed to make the cell stack 100 in a compressed state, and then the cell stack 100 may be placed inside the module housing 300 and have pressure applied so that the outermost secondary battery cell 110 of the cell stack 100 comes in contact with a side surface wall of the module housing 300.

Meanwhile, the method of setting the cell pressure range according to the present disclosure may further include a third operation of determining the cell pressure range by additionally reflecting an allowable expansion dimension of the module housing 300.

The secondary battery module may be manufactured in various sizes as needed. For example, in the case of electric vehicles, a plurality of secondary battery modules are connected to form a secondary battery pack, and the secondary battery pack is mounted on an electric vehicle. Each electric vehicle has a different space for installing a secondary battery pack or a secondary battery module. Therefore, the secondary battery pack or the secondary battery module needs to be installed and maintained within a certain space. To this end, it is important to manage the dimensions of the secondary battery pack or the secondary battery module.

Thus, in the third operation, an allowable expansion dimension of the module housing 300 according to the swelling of the secondary battery cells 110 is preset in consideration of environmental conditions in which the secondary battery module is to be mounted, a minimum pressure, Pdimension_min, at which the module housing 300 may be managed within the allowable expansion dimension by pressing the cell stack 100 in the BOL of the secondary battery cells 110, is derived, and a minimum pressure, Pdimension_max, at which the module housing 300 may be managed within the allowable expansion dimension by pressing the cell stack 100 in the EOL of the secondary battery cells 110, is derived.

Here, the allowable expansion dimension may be determined by a client company's request. For example, the client company may determine the width of the secondary battery module to 120 mm, but may limit allowable width due to expansion of the secondary battery sells to 123 mm. In this case, the cell stack 100 needs to be pressed so that the cell stack 100 may not expand by 3 mm or more.

In the BOL, the swelling phenomenon of the secondary battery cells 110 is caused by the contraction and expansion of the electrode thickness during charging and discharging, and thus, the allowable expansion dimension may be managed even with a relatively small pressure. Reflecting the above, a minimum pressure that can limit the allowable expansion dimension (ex: 3 mm) of the cell stack 100 by pressing the secondary battery cells with module housing 300 in the BOL is set to Pdimension_min.

In the EOL, the swelling phenomenon of the secondary battery cells 110 is caused by generation of gas as well as the contraction and expansion of the electrode thickness during charging and discharging. Thus relatively greater pressure is required in the EOL than in the BOL to manage the allowable expansion dimension. Reflecting the above, a minimum pressure that can limit the allowable expansion dimension (ex: 3 mm) of the cell stack 100 by pressing the secondary battery cells with module housing 300 in the EOL is set to Pdimension_max.

Next, by comparing Pdimension_min and Pdimension_max with Pcell_min, Pcell_max, Pmodule_min, and Pdimension_max, which are obtained in the first operation and the second operation, under the following conditions, the cell pressure range is finally set.

$P\text{design\_min} = \text{Max.}(P\text{cell\_min}, P\text{module\_min}, P\text{dimension\_min})$ $P\text{design\_max} = \text{Min.}(P\text{cell\_max}, P\text{module\_max})$, [wherein, (Pdimension_max<Pcell_max) & (Pdimension_max<Pmodule_max) are satisfied]

Figure 7:
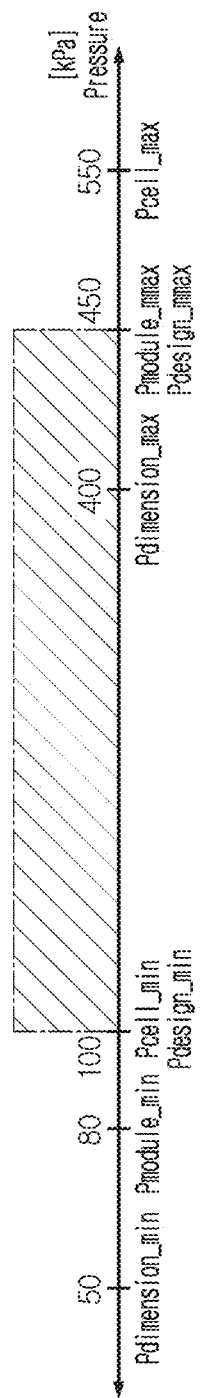
FIG. 7 is a diagram illustrating a cell pressure range according to a result of performing a first operation, a second operation, and a third operation of a method of setting a cell pressure range, according to an embodiment of the present disclosure.

For example, as in FIG. 7, when Pdimension_min is 50 kPa and Pdimension_max is 400 kPa, Pdesign_min may be set to 100 kPa and Pdesign_max may be set to 450 kPa.

Assuming that Pdimension_max is calculated as 500 kPa in the third operation, this is a pressure that may damage the module housing 300, and a structural rigidity design of the module housing 300 is wrong, and thus the module housing 300 needs to be redesigned.

Figure 8:
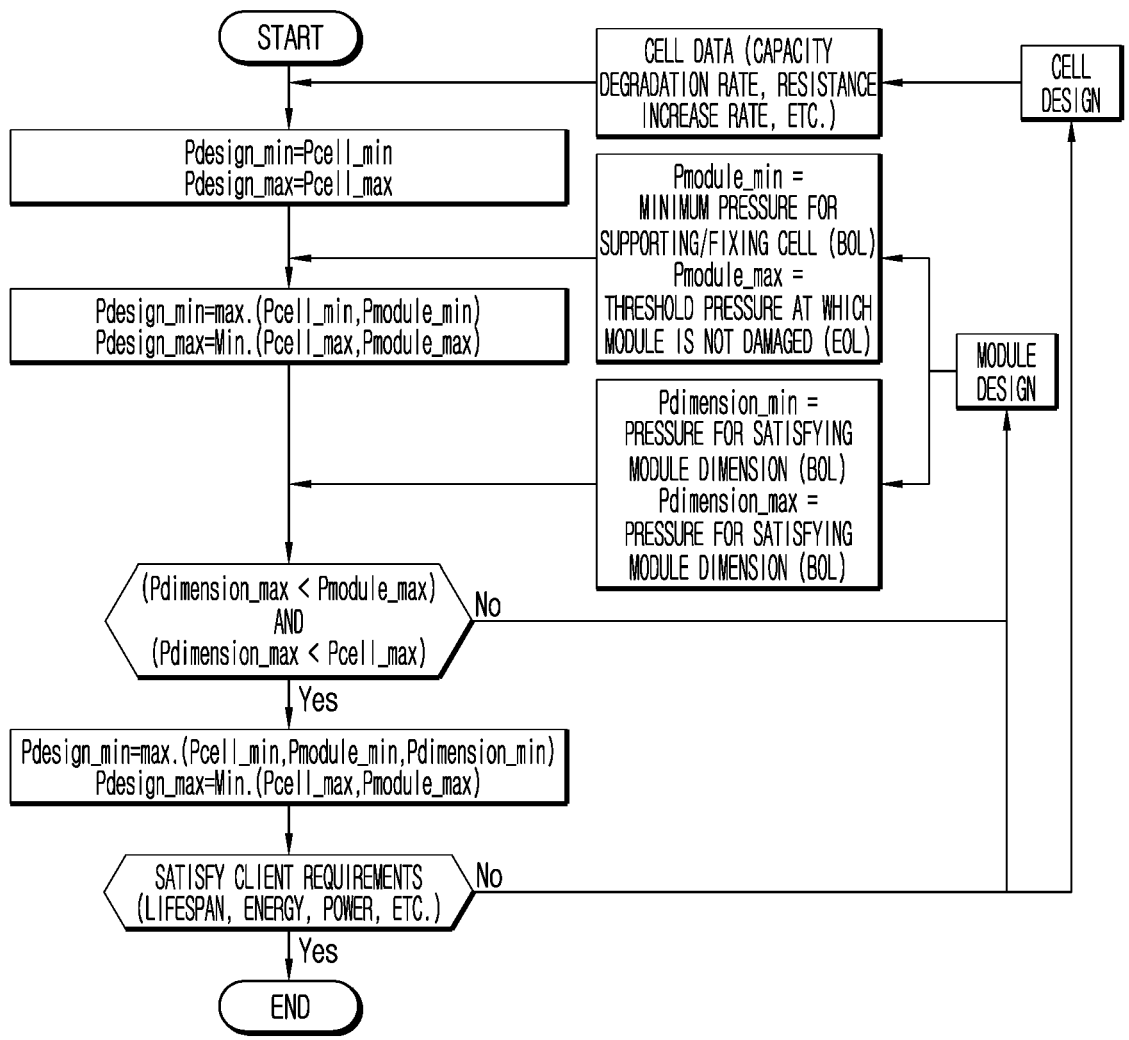
FIG. 8 is a flowchart illustrating a method of designing a secondary battery module, to which a method of setting a cell pressure range is applied, according to the present disclosure.

FIG. 8 is a flowchart illustrating a method of designing a secondary battery module, to which a method of setting a cell pressure range is applied, according to the present disclosure.

Referring to FIG. 8, a method of setting a cell pressure range according to an embodiment of the present disclosure is briefly summarized as follows.

As a first operation, a secondary battery cell 110 to be applied to a secondary battery module is determined, cell data according to pressure is analyzed for the unit secondary battery cell 110, and based on this, (Pcell_min, Pcell_max) is derived.

As a second operation, a cell stack 100 is formed by using the secondary battery cells 110, and a minimum pressure, at which the cell stack 100 may be integrally supported and fixed in BOL, and a maximum pressure, at which the cell stack 100 may be pressed as much as possible while maintaining the rigidity of a module housing 300 so as not to be damaged in EOL, are found and derived as (Pmodule_min, Pmodule_max).

Next, in a third operation, (Pdimension_min, Pdimension_max) for managing an allowable expansion dimension of the secondary battery module, which is requested by a client company, is derived.

Next, when a value of Pdimension_max is greater than Pcell_max or Pmodule_max, which is previously obtained, the secondary battery cell 110 or the module housing 300 is redesigned, and the above process is repeated. When a value of Pdimension_max is less than Pcell_max and Pmodule_max, which are previously obtained, it may be seen that the design of the secondary battery cell 110 and the module housing 300 is suitable. At this time, a value that meets the following conditions is set as maximum and minimum values of a cell pressure setting range.

$P\text{design\_min} = \text{Max.}(P\text{cell\_min}, P\text{module\_min}, P\text{dimension\_min})$ $P\text{design\_max} = \text{Min.}(P\text{cell\_max}, P\text{module\_max})$ As described above, according to the method of setting the cell pressure range according to the present disclosure, the secondary battery cells 110 may be pressed with a pressure in a range in which the performance, structural stability, and allowable expansion dimension of the secondary battery module are manageable.

Meanwhile, the secondary battery module according to the present disclosure may include the cell stack 100, which is an assembly of the secondary battery cells 110, the module housing 300 for pressing and storing the cell stack 100, and the ICB cover assembly 200. Also, the secondary battery module of the present disclosure may be configured in such a manner that the cell stack 100 is pressed within a pressure range that is set according to the method of setting the cell pressure range.

The secondary battery pack according to the present disclosure may include one or more secondary battery modules. The secondary battery pack may further include, in addition to the secondary battery module, a pack case for storing the secondary battery module, and various apparatuses for controlling charging and discharging of the secondary battery module. For example, a battery management system (BMS) current sensor and a fuse may be further included.

The secondary battery pack according to the present disclosure may be applied to vehicles such as electric vehicles or hybrid vehicles.

As described above, although the present disclosure has been described according to limited embodiments and drawings, the present disclosure is not limited thereto, and various modifications and variations are possible within the scope of the technical idea of the present disclosure and claims to be described below by those of ordinary skill in the art to which the present disclosure pertains.

Meanwhile, although the terms indicating directions such as up, down, left, and right described in the present specification are used, it would be obvious to a person skilled in the art that the terms are only for convenience of description and may vary depending on the position of an object or the position of an observer.

What is claimed is:

1. A method of setting a cell pressure range for a secondary battery cells in a secondary battery module, the method comprising:

obtaining performance data of a secondary battery cell while the secondary battery cell is pressed with increasing pressure;

determining a minimum pressure for realizing performance of the secondary battery cell as Pcell_min and a maximum pressure for realizing performance of the secondary battery cell as Pcell_max based on the measured performance data;

determining, as Pmodule_min, a minimum pressure at which the cell stack is supported and fixed and determining, as Pmodule_max, a maximum pressure at which the cell stack is pressed without damage to the module housing in end of life (EOL) of the secondary battery cells when the secondary battery cells are stacked in one direction to form a cell stack and the cell stack is stored in a module housing, wherein an intersection range of the Pcell_min to the Pcell_max and the Pmodule_min to the Pmodule_max is set as the cell pressure range; and applying pressure within the cell pressure range to the cell stack stacked in the module housing.

2. The method of claim 1, wherein, the performance data of the secondary battery cell comprises at least one of a capacity degradation rate, a resistance increase rate, and a thickness retention rate of the secondary battery cell.

3. The method of claim 1, wherein the Pmodule_min is a minimum pressure at which the cell stack is supported and fixed in begin of life (BOL) of the secondary battery cells.

4. The method of claim 1, wherein the secondary battery cell is a pouch-type secondary battery cell.

5. The method of claim 1, further comprising:
pre-setting an allowable expansion dimension of the module housing according to swelling of the secondary battery cells;

determining, as Pdimension_min, a minimum pressure at which a dimension of the module housing is manageable within the allowable expansion dimension by pressing the cell stack in BOL of the secondary battery cells; and determining, as Pdimension_max, a maximum pressure at which a dimension of the module housing is manageable within the allowable expansion dimension by pressing the cell stack in the EOL of the secondary battery cells, wherein a largest value among the Pcell_min, the Pmodule_min, and the Pdimension_min is set as the minimum pressure of the cell pressure range, and when (the Pdimension_max<the Pcell_max) and (the Pdimension_max<the Pmodule_max) are satisfied, a smaller value of the Pcell_min and the Pmodule_min is set as the maximum pressure of the cell pressure range.

6. The method of claim 1, wherein the module housing comprises:
a bottom plate arranged under the cell stack; and
a left-side plate and a right-side plate that are bent at opposite edges of the bottom plate, extend upward, and have a predetermined inward angular inclination,
wherein the cell stack is placed between the left-side plate and the right-side plate to be pressed therebetween.

7. The method of claim 6, wherein the pressure applied to the cell stack is adjusted by adjusting sizes of inclinations of the left-side plate and the right-side plate.

8. The method of claim 1, wherein the module housing includes a leaf spring therein, and the cell stack is pressed by the leaf spring.

9. The method of claim 1, further comprising applying pressure to the cell stack with a leaf spring attached to an inner surface of the module housing.

10. The method of claim 1, further comprising biasing opposite sides of the module housing toward one another to apply pressure to the cell stack.

11. The method of claim 1, wherein applying pressure within the cell pressure range to the cell stack in the module housing comprises applying pressure with sidewalls of the module housing.

* * * * *